US012783405B2

(12) United States Patent
Yang

(10) Patent No.: US 12,783,405 B2
(45) Date of Patent: Nov. 3, 2026

(54) CONTROL METHOD OF FLASH MEMORY CONTROLLER AND ASSOCIATED MEMORY DEVICE

(71) Applicant: Silicon Motion, Inc., Hsinchu County (TW)

(72) Inventor: Tzu-Yi Yang, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 18/822,295

(22) Filed: Sep. 2, 2024

(65) Prior Publication Data

US 2026/0064581 A1 Mar. 5, 2026

(51) Int. Cl.
*G06F 12/02* (2006.01)
*G06F 3/06* (2006.01)

(52) U.S. Cl.
CPC ........ *G06F 12/0246* (2013.01); *G06F 3/0611* (2013.01); *G06F 3/064* (2013.01); *G06F 3/0679* (2013.01); *G06F 2212/7201* (2013.01)

(58) Field of Classification Search
CPC ......... G06F 12/0246; G06F 2212/7201; G06F 3/0611; G06F 3/064; G06F 3/0679
See application file for complete search history.

(56) References Cited

U.S. PATENT DOCUMENTS 10,353,586 B2 * 7/2019 Fujimoto .............. G06F 3/0679
11,734,175 B2 8/2023 Jin
2012/0320679 A1 * 12/2012 Sprouse .............. G06F 12/0246 365/185.12
2015/0026390 A1 * 1/2015 Li ....................... G06F 12/0246 711/103
2016/0378359 A1 * 12/2016 Jang .................... G06F 12/0246 711/118
2017/0139839 A1 * 5/2017 Ke ...................... G06F 12/1009
2018/0260163 A1 * 9/2018 Lee ...................... G06F 3/0619
2022/0066925 A1 * 3/2022 Park .................... G06F 12/0891

FOREIGN PATENT DOCUMENTS

CN 114968080 A 8/2022
TW 201612902 A 4/2016
TW 201730888 A 9/2017

* cited by examiner

*Primary Examiner* — Rocio Del Mar Perez-Velez
*Assistant Examiner* — Kaitlyn H Pham
(74) *Attorney, Agent, or Firm* — Winston Hsu

(57) ABSTRACT

The present invention provides a control method of a flash memory controller, wherein the flash memory controller is configured to access a flash memory module. The flash memory controller includes the steps of: selecting a block within the flash memory module, wherein the block is a blank block; writing data into the block; after the block is full, determining an amount of data from a host device written into the block, wherein the host device is external to the flash memory controller; and determining if the host device is performing a sequential write operation to write the data with consecutive logical addresses into the block according to a size of the block and the amount of data from the host device written into the block.

19 Claims, 6 Drawing Sheets

CONTROL METHOD OF FLASH MEMORY CONTROLLER AND ASSOCIATED MEMORY DEVICE

BACKGROUND OF THE INVENTION

1. Field of the Invention

The present invention relates to a flash memory controller.

2. Description of the Prior Art

In order to optimize the overall performance of a flash memory device, the flash memory device can perform some detection on the received commands from a host device to determine an access behavior of the host device. For example, the flash memory device may analyze all of the write commands sent from the host device to determine if the host is performing a sequential write operation, however, these write command analysis operations will greatly increase the burden on the firmware, thereby reducing the efficiency of data writing.

SUMMARY OF THE INVENTION

It is therefore an objective of the present invention to provide a flash memory controller that can accurately determine if the host is performing a sequential write operation without analyzing many write commands, to solve the problems described in the prior art.

According to one embodiment of the present invention, a control method of a flash memory controller is disclosed, wherein the flash memory controller is configured to access a flash memory module. The flash memory controller comprises the steps of: selecting a block within the flash memory module, wherein the block is a blank block; writing data into the block; after the block is full, determining an amount of data from a host device written into the block, wherein the host device is external to the flash memory controller; and determining if the host device is performing a sequential write operation to write the data with consecutive logical addresses into the block according to a size of the block and the amount of data from the host device written into the block.

According to one embodiment of the present invention, a flash memory controller is disclosed, wherein the flash memory controller is configured to access a flash memory module. The flash memory controller comprises a read only memory configured to store a program code, and a microprocessor configured to execute the program code to a control access of the flash memory module. The microprocessor is configured to perform the steps of: selecting a block within the flash memory module, wherein the block is a blank block; writing data into the block; after the block is full, determining an amount of data from a host device written into the block, wherein the host device is external to the flash memory controller; and determining if the host device is performing a sequential write operation to write the data with consecutive logical addresses into the block according to a size of the block and the amount of data from the host device written into the block.

According to one embodiment of the present invention, a memory device comprising a flash memory module and a flash memory controller is disclosed. The flash memory controller is configured to perform the steps of: selecting a block within the flash memory module, Wherein the block is a blank block; writing data into the block; after the block is full, determining an amount of data from a host device written into the block, wherein the host device is external to the flash memory controller; and determining if the host device is performing a sequential write operation to write the data with consecutive logical addresses into the block according to a size of the block and the amount of data from the host device written into the block.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms “including” and “comprising” are used in an open-ended fashion, and thus should be interpreted to mean “including, but not limited to . . . ”. The terms “couple” and “couples” are intended to mean either an indirect or a direct electrical connection. Thus, if a first device couples to a second device, that connection may be through a direct electrical connection, or through an indirect electrical connection via other devices and connections.

Figure 1:
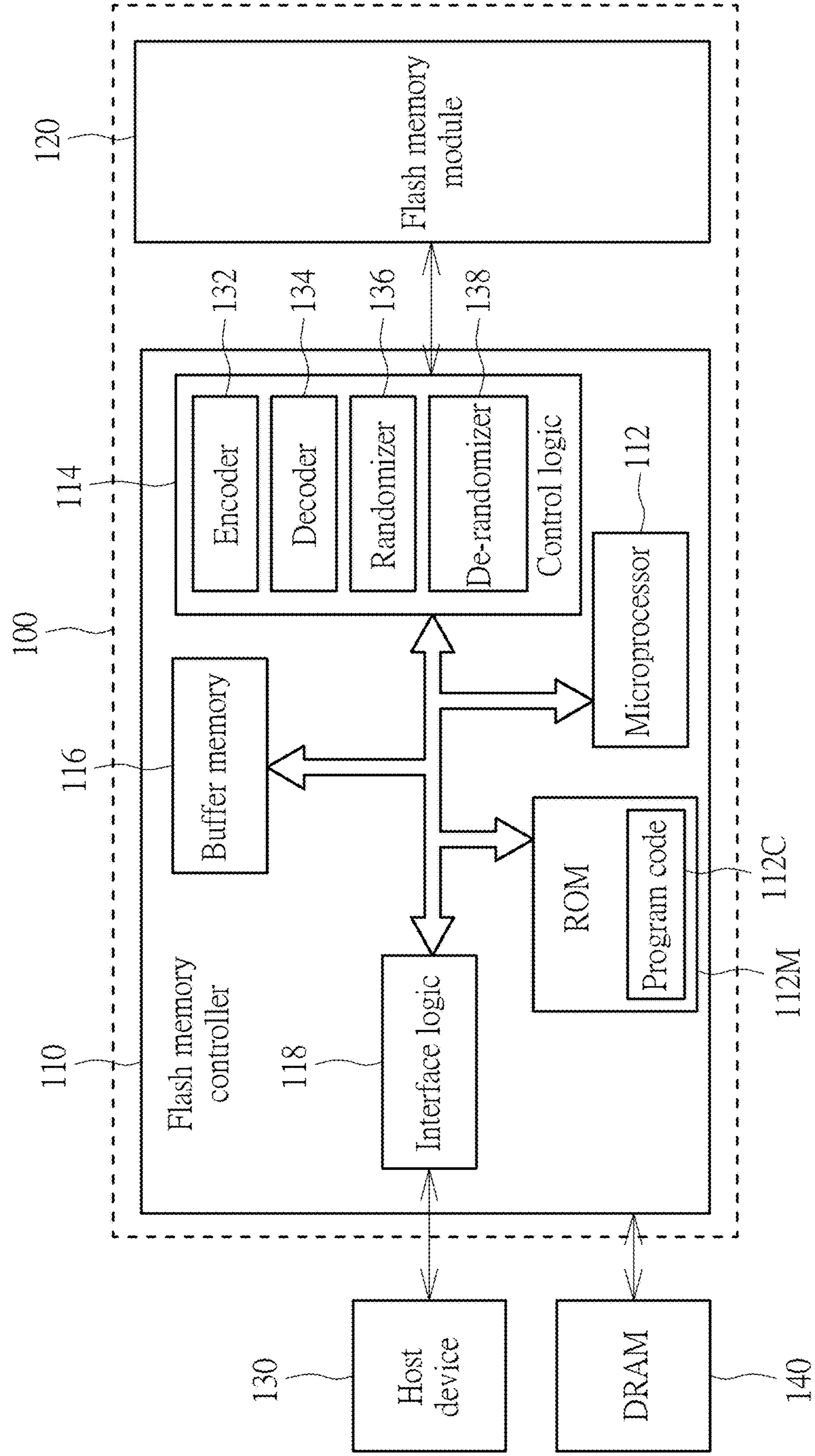
FIG. 1 is a diagram illustrating a memory device according to an embodiment of the present invention.

FIG. 1 is a diagram illustrating a memory device 100 according to an embodiment of the present invention. The memory device 100 includes a flash memory module 120 and a flash memory controller 110, wherein the flash memory controller 110 is arranged to access the flash memory module 120. The flash memory controller 110 includes a microprocessor 112, a read only memory (ROM) 112M, a control logic 114, a buffer memory 116 and an interface logic 118. The ROM 112M is arranged to store a program code 112C, and the microprocessor 112 is arranged to execute the program code 112C to control access of the flash memory module 120. The control logic 114 includes an encoder 132, a decoder 134, a randomizer 136 and a de-randomizer 138. The encoder 132 is arranged to encode data that is written into the flash memory module 120 to generate a corresponding parity (also known as an error correction code (ECC)), and the decoder 134 is arranged to decode data that is read from the flash memory module 120. The randomizer 136 is used to randomize the data written to the flash memory module 120, and the de-randomizer 138 is used to de-randomize the data read from the flash memory module 120.

Figure 2:
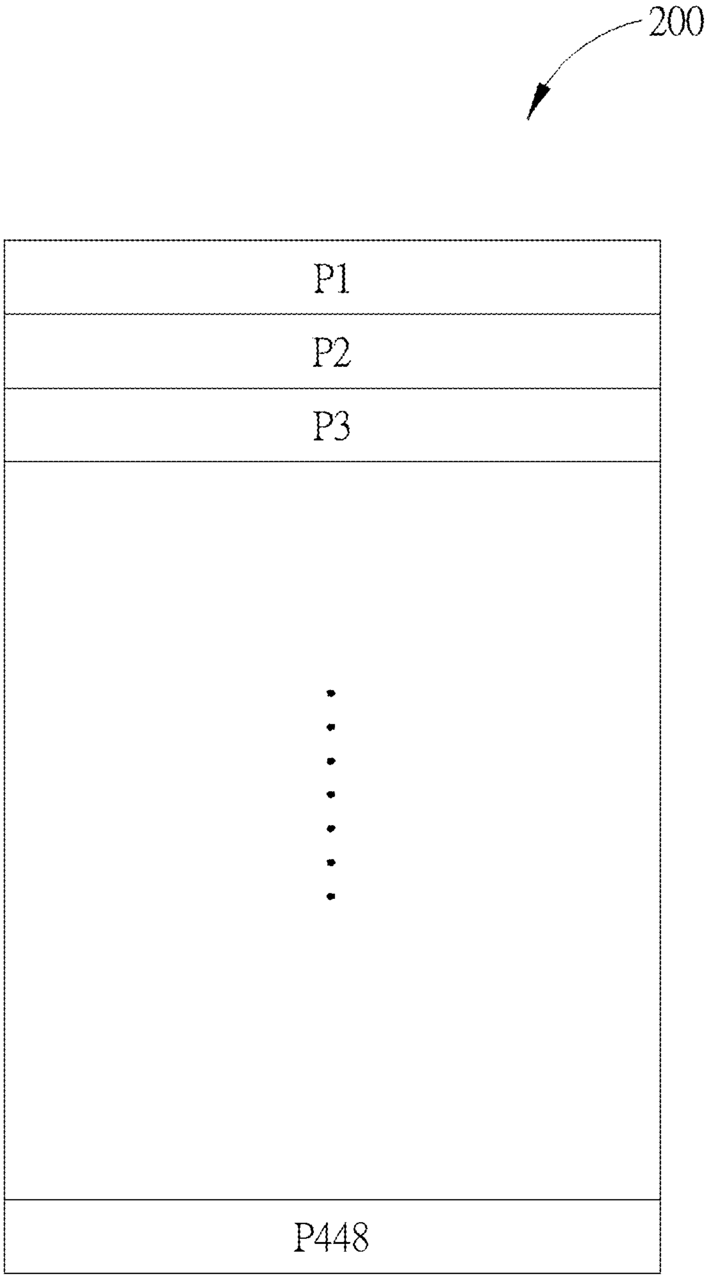
FIG. 2 shows a block including a plurality of pages.

In a general situation, the flash memory module 120 includes a plurality of flash memory chips, and each flash memory chip includes a plurality of blocks. A controller (e.g. the flash memory controller 110 that executes the program code 112C through the microprocessor 112) may copy, erase, and merge data for the flash memory module 120 with a block as a unit. In addition, referring to FIG. 2, a block 200 can record a specific number of pages such as pages P1-P448 in FIG. 2, wherein the controller (e.g. the flash memory controller 110 that executes the program code 112C through the microprocessor 112) may perform a data write operation upon the flash memory module 120 with a page as a unit. In other words, a block is the smallest erase unit in the flash memory module 120, and a page is the smallest write unit in the flash memory module 120.

In practice, the flash memory controller 110 that executes the program code 112C through the microprocessor 112 may utilize its own internal components to perform many control operations. For example, the flash memory controller 122 utilizes the control logic 114 to control access of the flash memory module 120 (more particularly, access at least one block or at least one page), utilizes the buffer memory 116 and/or a DRAM 140 to perform a required buffering operation, and utilizes the interface logic 118 to communicate with a host device 130.

In one embodiment, the memory device 100 may be a portable memory device such as a memory card which conforms to one of the SD/MMC, CF, MS and XD specifications, and the host device 130 is an electronic device able to be connected to the memory device 100, such as a cellphone, a laptop, a desktop computer, etc. In another embodiment, the memory device 100 can be a solid state drive (SSD) or an embedded storage device conforming to the universal flash storage (UFS) or embedded multi-media card (EMMC) specifications, and can be arranged in an electronic device. For example, the memory device 100 can be arranged in a cellphone, a watch, a portable medical testing device (e.g. a medical wristband), a laptop, or a desktop computer. In this case, the host device 130 can be a processor of the electronic device.

In this embodiment, the flash memory module 120 is a three-dimensional NAND-type flash memory module, in which each block is composed of a plurality of word lines, a plurality of bit lines and a plurality of memory cells. Since the three-dimensional NAND flash memory architecture is well known to a person skilled in the art, no further explanation is given in the specification.

Figure 3:
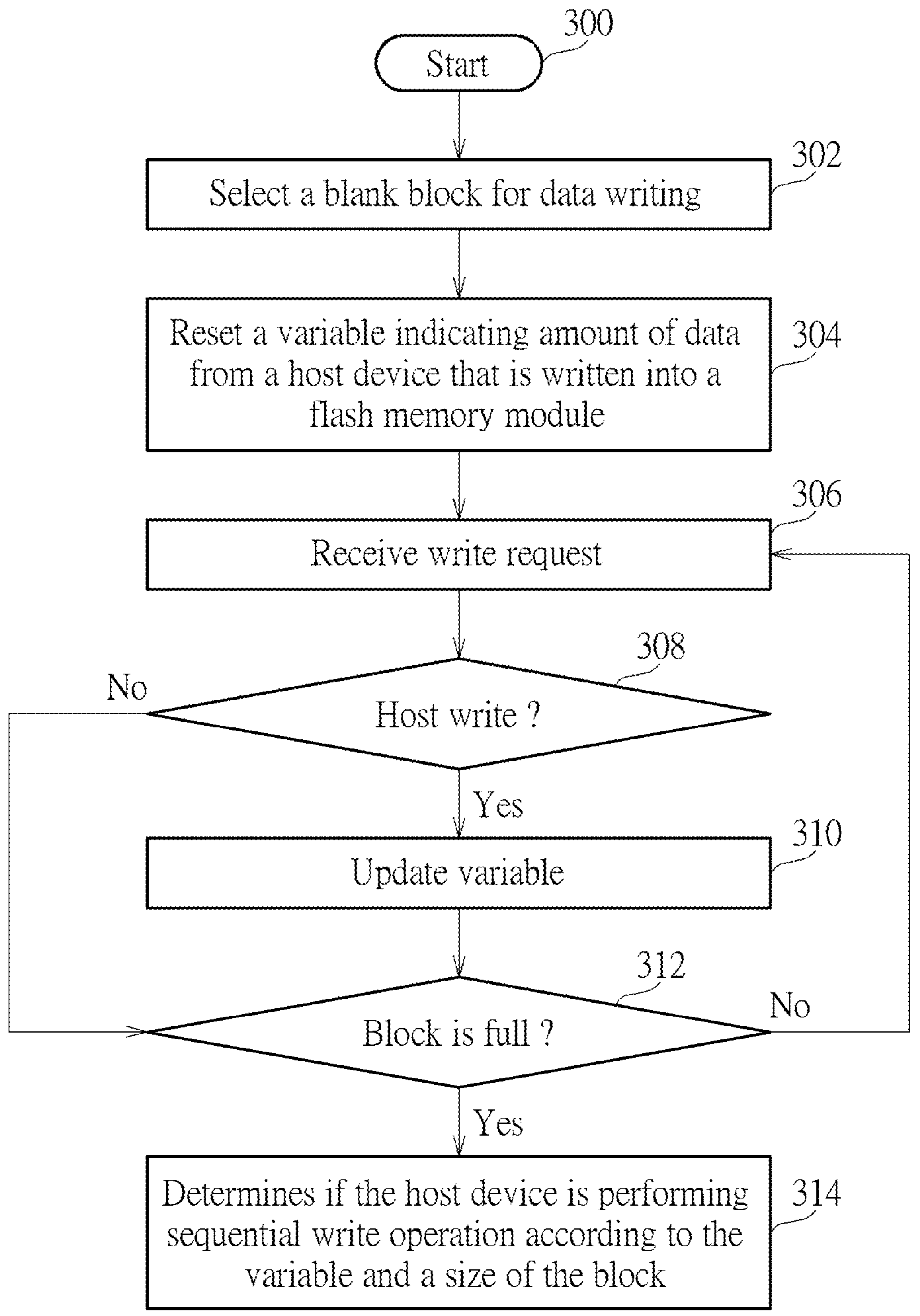
FIG. 3 is a flowchart of a control method of the flash memory controller according to one embodiment of the present invention.

FIG. 3 is a flowchart of a control method of the flash memory controller 110 according to one embodiment of the present invention. In Step 300, the flow starts, and the memory device 110 is powered on. In Step 302, the flash memory controller 110 selects a block of the flash memory module 120 for data writing, wherein the selected block is a blank block (also called a spare block) that does not store any data. In Step 304, the microprocessor 112 resets a variable temporarily stored in a buffer of the flash memory controller 110, wherein the variable indicates the amount of data from the host device 130 that is written into the flash memory module 120, and resetting the variable means that this variable has been reset to zero or a reference value.

In Step 306, the microprocessor 112 receives a write request to write data temporarily stored in the buffer memory 116 into the flash memory module 120. In Step 308, the microprocessor 112 determines if the data corresponding to the write request is sent from the host device 130, if yes, the flow enters Step 310; and if not, the flow enters Step 312. In this embodiment, the data temporarily stored in the buffer memory 116 may be from the host device 130, or the data temporarily stored in the buffer memory 116 may be the valid data of another block of the flash memory module 120 (i.e., a garbage collection operation is performed to move the valid data of an old block into a new block); and if the data temporarily stored in the buffer memory 116 is from the other block of the flash memory module 120, this data is determined as not coming from the host device 130.

In Step 310, the Microprocessor 112 Updates the Variable according to the amount of data that is written into the selected block from the buffer memory 116, wherein the data is from the host device 130. In this embodiment, the microprocessor 112 may update the variable by adding the amount of data written to selected block. It is noted that, the amount of data that is added into the variable only corresponds to the data sent from the host device 130, that is, if the microprocessor 112 writes some dummy data to the selected block together with the data from the host device in order to satisfy some memory writing conditions (for example, the write size must reach 16 kilo-bytes (KB) at a time), this dummy data is determined as not coming from the host device 130.

In Step 312, the microprocessor 112 determines if the selected block is full of data, that is the last page has been written, if yes, the flow enters Step 314; and if not, the flow goes back to Step 306 to receive a next write request.

In Step 314, the microprocessor 112 determines if the host device 130 is performing sequential write operation according to the variable and a size of the selected block. In one embodiment, the microprocessor 112 may determine if the host device 130 is performing sequential write operation by determining if a ratio between the variable and the size of the selected block is greater than a predetermined threshold such as 98% or 99%. If the ratio is greater than the predetermined threshold, the microprocessor 112 determines that the host device 130 is performing the sequential write operation. In addition, the microprocessor 112 may determine if the host device 130 is performing sequential write operation by determining if a different difference between the variable and the size of the selected block is less than another predetermined threshold; and if the difference is less than the other predetermined threshold, the microprocessor 112 determines that the host device 130 is performing the sequential write operation. In addition, because the data written into the selected block also has the error correction code (ECC) generated by the encoder 132, and the host device 130 may interrupt to update the file system metadata when writing multiple data with consecutive logical addresses, the above predetermined threshold can be determined according to designer's consideration.

When the host device 130 performs the sequential write operation to write the data with consecutive logical addresses into the selected block, almost all data written to selected block should come from the host device 130. Therefore, by using the embodiment shown in FIG. 3, the microprocessor 112 can accurately determine if the host device 130 is performing the sequential write operation, and the microprocessor 112 does not need to check each write command from the host device 130, thus reducing the burden on the microprocessor 112 compared to prior art.

Figure 4:
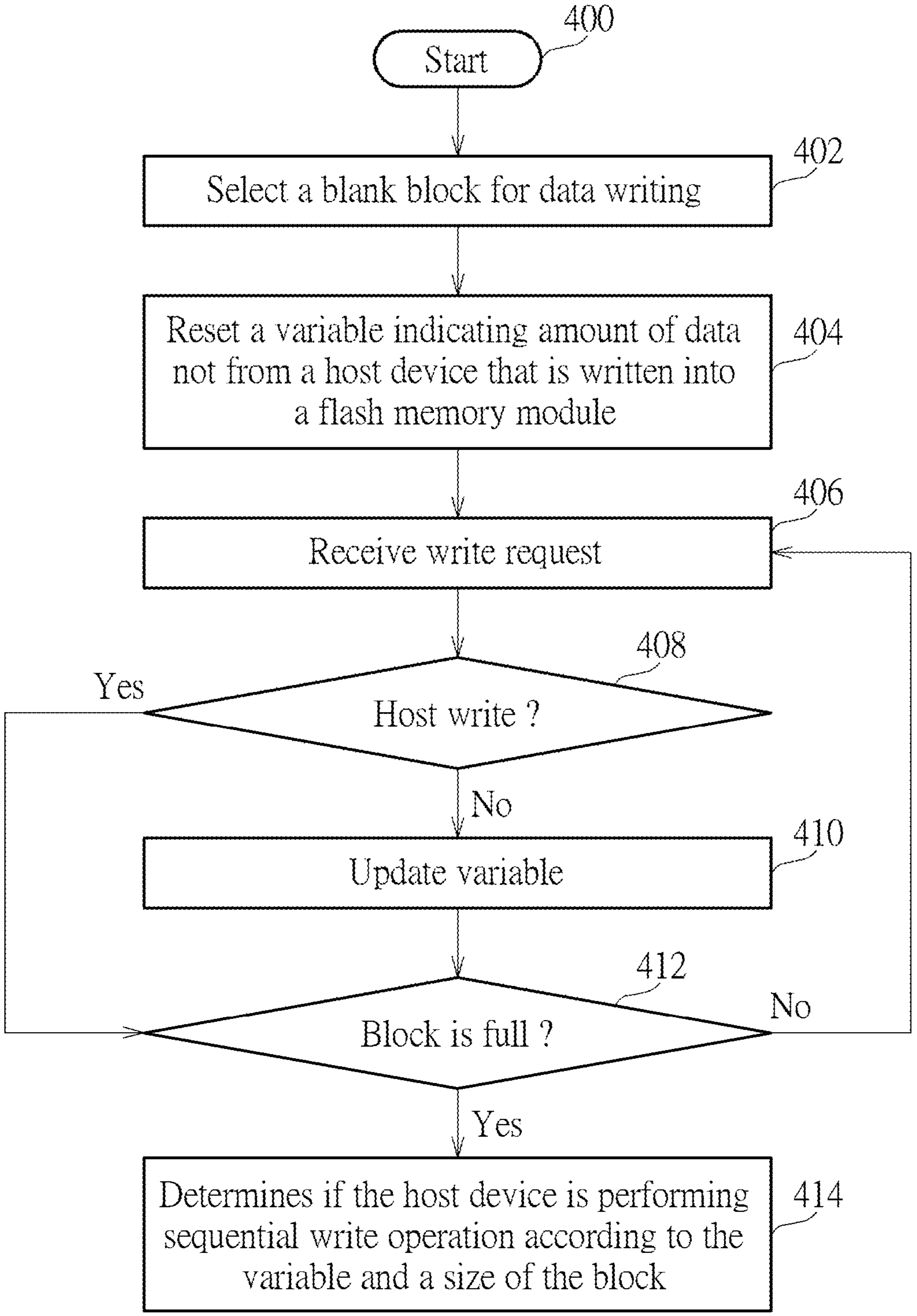
FIG. 4 is a flowchart of a control method of the flash memory controller according to one embodiment of the present invention.

FIG. 4 is a flowchart of a control method of the flash memory controller 110 according to one embodiment of the present invention. In Step 400, the flow starts, and the memory device 110 is powered on. In Step 402, the flash memory controller 110 selects a block of the flash memory module 120 for data writing, wherein the selected block is a blank block that does not store any data. In Step 404, the microprocessor 112 resets a variable temporarily stored in a buffer of the flash memory controller 110, wherein the variable indicates the amount of data not from the host device 130 that has been written into the flash memory module 120, and resetting the variable means that this variable has been reset to zero or a reference value.

In Step 406, the microprocessor 112 receives a write request to write data temporarily stored in the buffer memory 116 into the flash memory module 120. In Step 408, the microprocessor 112 determines if the data corresponding to the write request is sent from the host device 130, if yes, the flow enters Step 412; and if not, the flow enters Step 410. In this embodiment, the data temporarily stored in the buffer memory 116 may be from the host device 130, or the data temporarily stored in the buffer memory 116 may be the valid data of another block of the flash memory module 120 (i.e., a garbage collection operation is performed to move the valid data of an old block into a new block); and if the data temporarily stored in the buffer memory 116 is from the other block of the flash memory module 120, this data is determined as not coming from the host device 130.

In Step 410, the microprocessor 112 updates the variable according to the amount of data that is written into the selected block from the buffer memory 116, wherein the data is not from the host device 130. In this embodiment, the microprocessor 112 may update the variable by adding the amount of data written to selected block. It is noted that, the amount of data that is added into the variable only corresponds to the data not from the host device 130, that is, if the microprocessor 112 writes some dummy data to the selected block together with the data from the host device in order to satisfy some memory writing conditions, this dummy data is determined as not coming from the host device 130.

In Step 412, the microprocessor 112 determines if the selected block is full of data, that is the last page has been written, if yes, the flow enters Step 414; and if not, the flow goes back to Step 406 to receive a next write request.

In Step 414, the microprocessor 112 determines if the host device 130 is performing sequential write operation according to the variable and a size of the selected block. In one embodiment, microprocessor 112 may calculate the amount of data from the host device 130 written into the selected block by subtracting the variable by the size of the selected block, and the microprocessor 112 may determine if the host device 130 is performing sequential write operation by determining if a ratio between the calculated amount of data from the host device 130 and the size of the selected block is greater than a predetermined threshold such as 98% or 99%. If the ratio is greater than the predetermined threshold, the microprocessor 112 determines that the host device 130 is performing the sequential write operation. In addition, the microprocessor 112 may determine if the host device 130 is performing sequential write operation by determining if a different difference between the calculated amount of data from the host device 130 and the size of the selected block is less than another predetermined threshold; and if the difference is less than the other predetermined threshold, the microprocessor 112 determines that the host device 130 is performing the sequential write operation.

Figure 5:
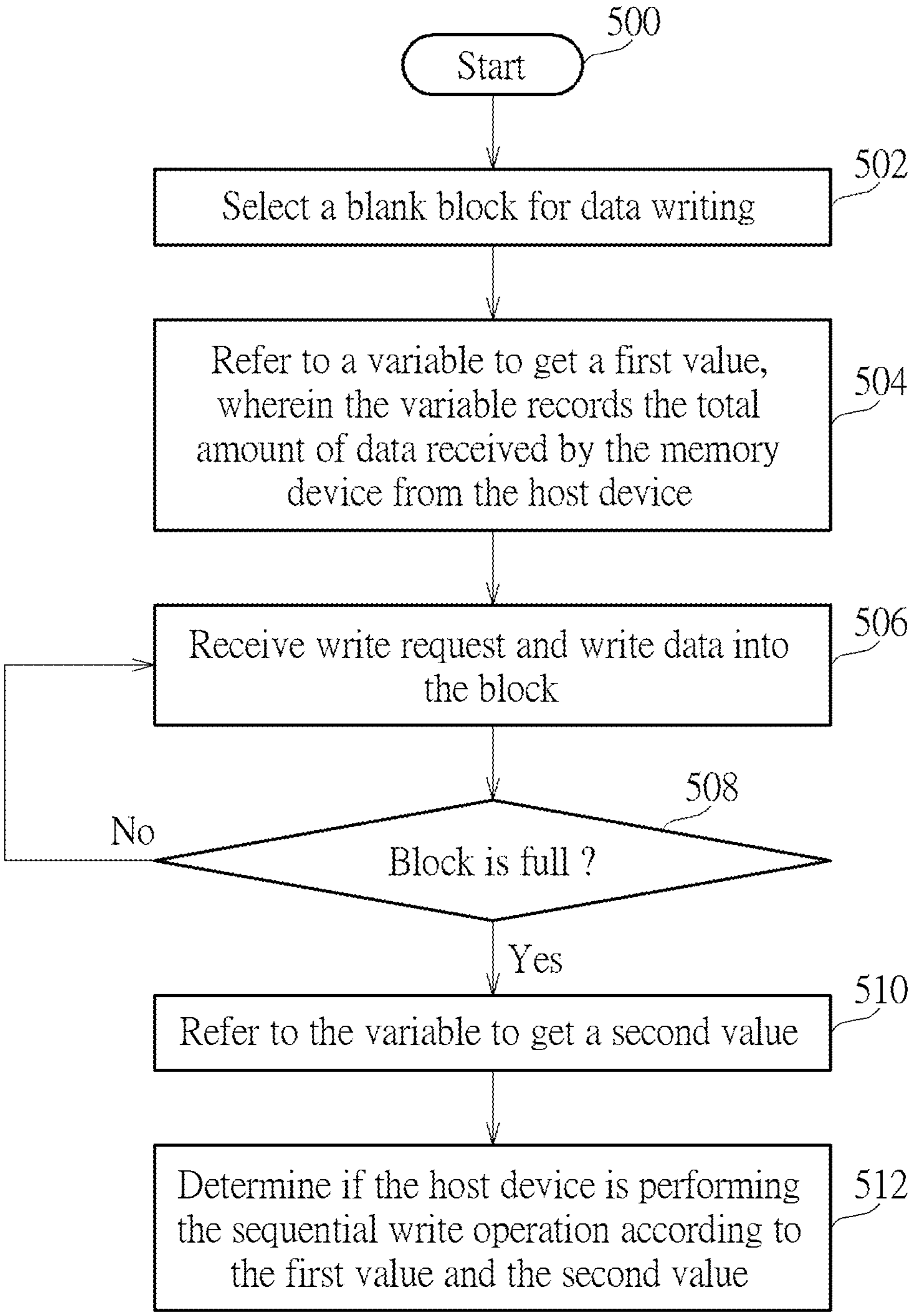
FIG. 5 is a flowchart of a control method of the flash memory controller according to one embodiment of the present invention.

FIG. 5 is a flowchart of a control method of the flash memory controller 110 according to one embodiment of the present invention. In Step 500, the flow starts, and the memory device 110 is powered on. In Step 502, the flash memory controller 110 selects a block of the flash memory module 120 for data writing, wherein the selected block is a blank block that does not store any data. In Step 504, the microprocessor 112 refers to a variable to get a first value, wherein the variable is used to record the total amount of data received by the memory device 100 from the host device 130, and the first value is a current value of the variable.

In Step 506, the microprocessor 112 receives a write request to write data temporarily stored in the buffer memory 116 into the flash memory module 120, and the microprocessor 112 writes the data into the selected block through the control logic 114. In Step 508, the microprocessor 112 determines if the selected block is full of data, that is the last page has been written, if yes, the flow enters Step 510; and if not, the flow goes back to Step 506 to receive and process a next write request.

In Step 510, the microprocessor 112 refers to a variable to get a second value, wherein the second value is a current value of the variable used to record the total amount of data received by the memory device 100 from the host device 130.

In Step 512, the microprocessor 112 determines if the host device 130 is performing the sequential write operation according to the first value and the second value. In one embodiment, microprocessor 112 may calculate the amount of data from the host device 130 written into the selected block by subtracting the first value by the second value, and the microprocessor 112 may determine if the host device 130 is performing sequential write operation by determining if a ratio between the calculated amount of data from the host device 130 and the size of the selected block is greater than a predetermined threshold such as 98% or 99%. If the ratio is greater than the predetermined threshold, the microprocessor 112 determines that the host device 130 is performing the sequential write operation. In addition, the microprocessor 112 may determine if the host device 130 is performing sequential write operation by determining if a different difference between the calculated amount of data from the host device 130 and the size of the selected block is less than another predetermined threshold; and if the difference is less than the other predetermined threshold, the microprocessor 112 determines that the host device 130 is performing the sequential write operation.

Figure 6:
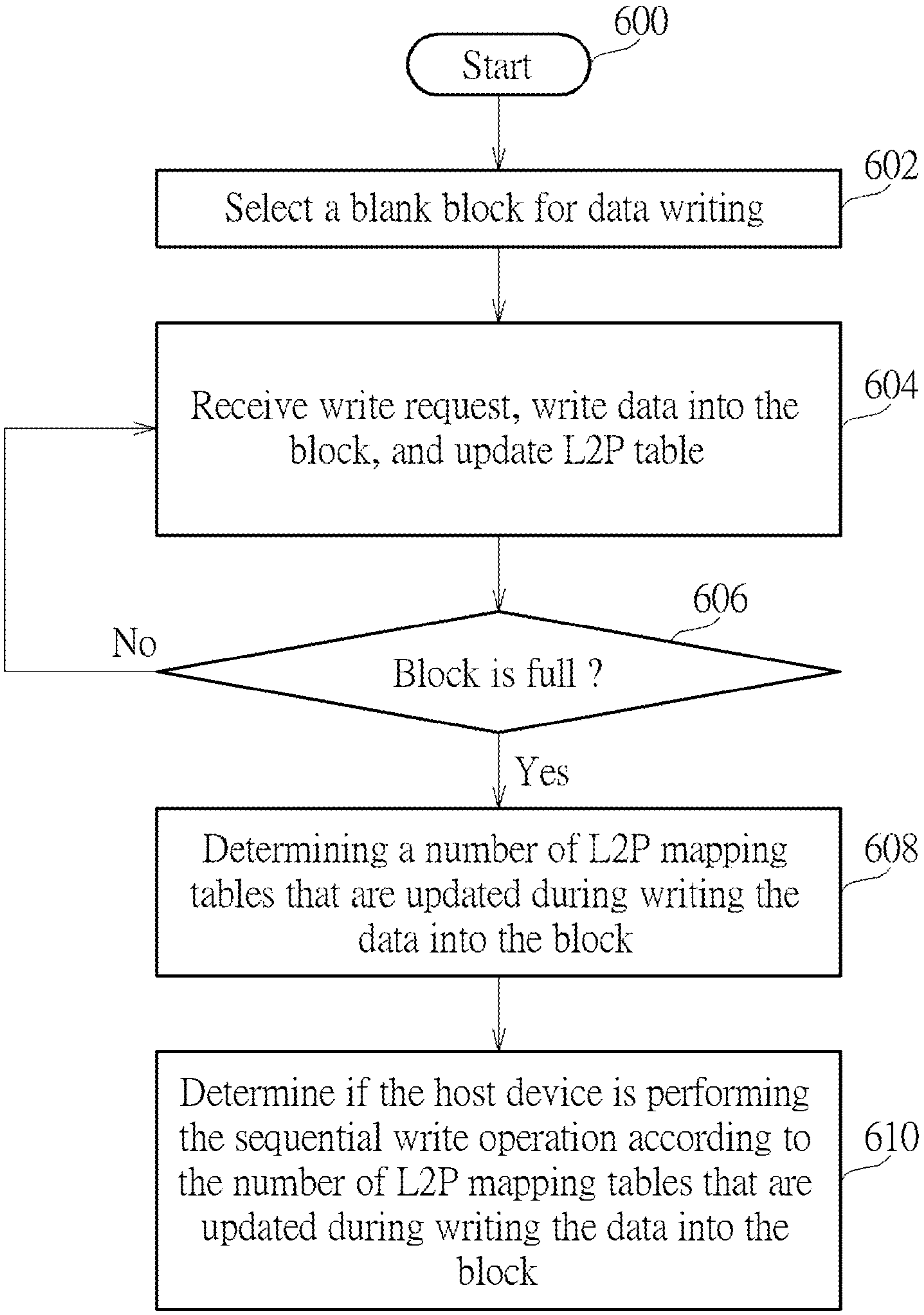
FIG. 6 is a flowchart of a control method of the flash memory controller according to one embodiment of the present invention.

FIG. 6 is a flowchart of a control method of the flash memory controller 110 according to one embodiment of the present invention. In Step 600, the flow starts, and the memory device 110 is powered on. In Step 602, the flash memory controller 110 selects a block of the flash memory module 120 for data writing, wherein the selected block is a blank block that does not store any data. In Step 604, the microprocessor 112 receives a write request to write data temporarily stored in the buffer memory 116 into the flash memory module 120, and the microprocessor 112 writes the data into the selected block through the control logic 114, and the microprocessor 112 updates one or more logical-to-physical (L2P) mapping tables according to the logical address of the data and the physical address of the page of the selected block that is used to store the data. Specifically, the memory device 110 records many L2P tables, each L2P mapping table records a plurality of consecutive logical addresses and corresponding physical addresses, that is, each L2P mapping table records which physical address in the flash memory module 120 the data with these logical addresses are stored in. For example, a first L2P mapping table includes logical addresses LBA1-LBA1024, a second L2P mapping table MT2 includes logical addresses LBA1025-LBA2048, a third L2P mapping table MT2 includes logical addresses LBA2049-LBA3072, and so on. If the data with the logical addresses LBA1-LBA4 are written into the selected block, the first L2P mapping table will be updated to update the physical addresses corresponding to the logical addresses LBA1-LBA4.

In Step 606, the microprocessor 112 determines if the selected block is full of data, that is the last page has been written, if yes, the flow enters Step 608; and if not, the flow goes back to Step 604 to receive and process a next write request.

In Step 608, the microprocessor 112 determines how many L2P mapping tables are updated during the data writing of the selected block. In Step 610, the microprocessor 112 determines if the host device 130 is performing the sequential write operation according to the number of L2P mapping tables that are updated during the data writing of the selected block. In one embodiment, if the number of L2P mapping tables that are updated during the data writing of the selected block is greater than a threshold value, it means that the logical addresses of the data written into the selected block are located in many L2P mapping tables, so the microprocessor 112 can determine that part of the logical addresses of the data written into the selected block are not consecutive, and the host device 130 does not perform the sequential write operation. In addition, if the number of L2P mapping tables that are updated during the data writing of the selected block is not greater than a threshold value, the microprocessor 112 determines that the host device 130 is performing the sequential write operation.

In the above embodiments, the microprocessor 112 can accurately determine if the host device 130 is performing the sequential write operation without checking each write command from the host device 130, so it will not affect the performance of the microprocessor 112 too much.

In another embodiment, both the embodiments of FIG. 3 and FIG. 6 are used to determine if the host device 130 is performing the sequential write operation, that is, only when both Steps 314 and 610 are satisfied, the microprocessor 112 will determine that the host device 130 is performing the sequential write operation. Specifically, only when the ratio/difference between the variable and the size of the selected block is greater/less than the predetermined threshold in Step 314, and the number of L2P mapping tables that are updated during the data writing of the selected block is not greater than the threshold value in Step 610, the microprocessor 112 will determine that the host device 130 is performing the sequential write operation.

In another embodiment, both the embodiments of FIG. 4 and FIG. 6 are used to determine if the host device 130 is performing the sequential write operation, that is, only when both Steps 414 and 610 are satisfied, the microprocessor 112 will determine that the host device 130 is performing the sequential write operation. Specifically, only when the ratio/difference between the calculated amount of data from the host device 130 and the size of the selected block is greater/less than the predetermined threshold in Step 414, and the number of L2P mapping tables that are updated during the data writing of the selected block is not greater than the threshold value in Step 610, the microprocessor 112 will determine that the host device 130 is performing the sequential write operation.

In another embodiment, both the embodiments of FIG. 5 and FIG. 6 are used to determine if the host device 130 is performing the sequential write operation, that is, only when both Steps 512 and 610 are satisfied, the microprocessor 112 will determine that the host device 130 is performing the sequential write operation. Specifically, only when the ratio/difference between the calculated amount of data from the host device 130 and the size of the selected block is greater/less than the predetermined threshold in Step 512, and the number of L2P mapping tables that are updated during the data writing of the selected block is not greater than the threshold value in Step 610, the microprocessor 112 will determine that the host device 130 is performing the sequential write operation.

In addition, after the microprocessor 112 determines that the host device 130 is performing the sequential write operation, the microprocessor 112 may use different writing strategy to access the flash memory module 120. For example, if the host device 130 does not perform the sequential write operation, the flash memory controller 110 may control the flash memory module 120 to use one block with open state to store the data from the host device 130 and the data of garbage collection operation. If the host device 130 is performing the sequential write operation, the flash memory controller 110 may control the flash memory module 120 to use two blocks with open state to store the data from the host device 130 and the data of garbage collection operation, respectively, to prevent the garbage collection operation from affecting the data writing of the host device 130.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of a flash memory controller, wherein the flash memory controller is configured to access a flash memory module, and the control method comprises:

receiving at least one write command from a host device;

in response to the at least one write command:

selecting a block within the flash memory module, wherein the block is a blank block;

writing data into the block;

after the block is full, determining an amount of data from the host device written into the block, wherein the host device is external to the flash memory controller;

determining if a sequential write operation to write the data with consecutive logical addresses into the block has been performed by the host device, according to a size of the block and the amount of data from the host device written into the block, to generate a determination result;

determining a write strategy to access the flash memory module according to the determination result indicating whether the sequential write operation to write the data with consecutive logical addresses into the block has been performed by the host device; and controlling the flash memory module to store subsequent data according to the determined write strategy;

wherein controlling the flash memory module to store the subsequent data according to the determined write strategy comprises:

when the determination result indicates that the sequential write operation has been performed by the host device, controlling the flash memory module to use two blocks with open states to store the subsequent data; and when the determination result indicates that the sequential write operation has not been performed by the host device, controlling the flash memory module to use one block with an open state to store the subsequent data.

2. The control method of claim 1, further comprising:

before writing the data into the block, resetting a variable indicating the amount of data from the host device that is written into the flash memory module; and updating the variable according to the amount of data that is written into the block; and the step of determining the amount of data from the host device written into the block comprises:

after the block is full, using the variable to determine the amount of data from the host device written into the block.

3. The control method of claim 1, further comprising:

before writing the data into the block, resetting a variable indicating the amount of data not from the host device that is written into the flash memory module; and updating the variable according to the amount of data that is written into the block; and the step of determining the amount of data from the host device written into the block comprises:

after the block is full, determining the amount of data from the host device written into the block by subtracting the variable by the size of the block.

4. The control method of claim 1, further comprising:

before writing the data into the block, referring to a variable to get a first value, wherein the variable is used to record a total amount of data received by the flash memory controller from the host device;

after the block is full, referring to the variable to get a second value; and the step of determining the amount of data from the host device written into the block comprises:

determining the amount of data from the host device written into the block by subtracting the first value by the second value.

5. The control method of claim 1, wherein the step of determining if the sequential write operation to write the data with consecutive logical addresses into the block has been performed by the host device, according to the size of the block and the amount of data from the host device written into the block comprises:

determining if the sequential write operation has been performed by the host device by determining if a ratio between the amount of data from the host device written into the block and the size of the block is greater than a predetermined threshold; and if the ratio between the amount of data from the host device written into the block and the size of the block is greater than the predetermined threshold, determining that the sequential write operation has been performed by the host device.

6. The control method of claim 1, wherein the step of determining if the sequential write operation to write the data with consecutive logical addresses into the block has been performed by the host device, according to the size of the block and the amount of data from the host device written into the block comprises:

determining if the sequential write operation has been performed by the host device by determining if a difference between the amount of data from the host device written into the block and the size of the block is less than a predetermined threshold; and if the difference between the amount of data from the host device written into the block and the size of the block is less than the predetermined threshold, determining that the sequential write operation has been performed by the host device.

7. The control method of claim 1, further comprising:

determining a number of logical-to-physical (L2P) mapping tables that are updated during writing the data into the block, wherein each of the L2P mapping tables records a plurality of consecutive logical addresses and corresponding physical addresses in the flash memory module; and the step of determining if the sequential write operation to write the data with consecutive logical addresses into the block has been performed by the host device, according to the size of the block and the amount of data from the host device written into the block comprises:

determining if the sequential write operation to write the data with consecutive logical addresses into the block has been performed by the host device, according to the size of the block and the amount of data from the host device written into the block, and the number of L2P mapping tables that are updated during writing the data into the block.

8. A flash memory controller, wherein the flash memory controller is configured to access a flash memory module, and the flash memory controller comprises:

a read only memory, configured to store a program code; and a microprocessor, configured to execute the program code to control access of the flash memory module;

wherein the microprocessor is configured to perform the steps of:

receiving at least one write command from a host device;

in response to the at least one write command:

selecting a block within the flash memory module, wherein the block is a blank block;

writing data into the block;

after the block is full, determining an amount of data from the host device written into the block, wherein the host device is external to the flash memory controller;

determining if a sequential write operation to write the data with consecutive logical addresses into the block has been performed by the host device, according to a size of the block and the amount of data from the host device written into the block, to generate a determination result;

determining a write strategy to access the flash memory module according to the determination result indicating whether the sequential write operation to write the data with consecutive logical addresses into the block has been performed by the host device; and controlling the flash memory module to store subsequent data according to the determined write strategy;

wherein controlling the flash memory module to store the subsequent data according to the determined write strategy comprises:

when the determination result indicates that the sequential write operation has been performed by the host device, controlling the flash memory module to use two blocks with open states to store the subsequent data; and when the determination result indicates that the sequential write operation has not been performed by the host device, controlling the flash memory module to use one block with an open state to store the subsequent data.

9. The flash memory controller of claim 8, further comprising:

before writing the data into the block, resetting a variable indicating the amount of data from the host device that is written into the flash memory module; and updating the variable according to the amount of data that is written into the block; and the step of determining the amount of data from the host device written into the block comprises:

after the block is full, using the variable to determine the amount of data from the host device written into the block.

10. The flash memory controller of claim 8, further comprising:

before writing the data into the block, resetting a variable indicating the amount of data not from the host device that is written into the flash memory module; and updating the variable according to the amount of data that is written into the block; and the step of determining the amount of data from the host device written into the block comprises:

after the block is full, determining the amount of data from the host device written into the block by subtracting the variable by the size of the block.

11. The flash memory controller of claim 8, further comprising:

before writing the data into the block, referring to a variable to get a first value, wherein the variable is used to record a total amount of data received by the flash memory controller from the host device;

after the block is full, referring to the variable to get a second value; and the step of determining the amount of data from the host device written into the block comprises:

determining the amount of data from the host device written into the block by subtracting the first value by the second value.

12. The flash memory controller of claim 8, wherein the step of determining if the sequential write operation to write the data with consecutive logical addresses into the block has been performed by the host device, according to the size of the block and the amount of data from the host device written into the block comprises:

determining if the sequential write operation has been performed by the host device by determining if a ratio between the amount of data from the host device written into the block and the size of the block is greater than a predetermined threshold; and if the ratio between the amount of data from the host device written into the block and the size of the block is greater than the predetermined threshold, determining that the sequential write operation has been performed by the host device.

13. The flash memory controller of claim 8, wherein the step of determining if the sequential write operation to write the data with consecutive logical addresses into the block has been performed by the host device, according to the size of the block and the amount of data from the host device written into the block comprises:

determining if the sequential write operation has been performed by the host device by determining if a difference between the amount of data from the host device written into the block and the size of the block is less than a predetermined threshold; and if the difference between the amount of data from the host device written into the block and the size of the block is less than the predetermined threshold, determining that the sequential write operation has been performed by the host device.

14. The flash memory controller of claim 8, further comprising:

determining a number of logical-to-physical (L2P) mapping tables that are updated during writing the data into the block, wherein each of the L2P mapping tables records a plurality of consecutive logical addresses and corresponding physical addresses in the flash memory module; and the step of determining if the sequential write operation to write the data with consecutive logical addresses into the block has been performed by the host device, according to the size of the block and the amount of data from the host device written into the block comprises:

determining if the sequential write operation to write the data with consecutive logical addresses into the block has been performed by the host device, according to the size of the block and the amount of data from the host device written into the block, and the number of L2P mapping tables that are updated during writing the data into the block.

15. A memory device, comprising:

a flash memory module; and a flash memory controller, configured to access the flash memory module;

wherein the flash memory controller is configured to perform the steps of:

receiving at least one write command from a host device;

in response to the at least one write command:

selecting a block within the flash memory module, wherein the block is a blank block;

writing data into the block;

after the block is full, determining an amount of data from the host device written into the block, wherein the host device is external to the flash memory controller;

determining if a sequential write operation to write the data with consecutive logical addresses into the block has been performed by the host device, according to a size of the block and the amount of data from the host device written into the block, to generate a determination result;

determining a write strategy to access the flash memory module according to the determination result indicating whether the sequential write operation to write the data with consecutive logical addresses into the block has been performed by the host device; and controlling the flash memory module to store subsequent data according to the determined write strategy;

wherein controlling the flash memory module to store the subsequent data according to the determined write strategy comprises:

when the determination result indicates that the sequential write operation has been performed by the host device, controlling the flash memory module to use two blocks with open states to store the subsequent data; and when the determination result indicates that the sequential write operation has not been performed by the host device, controlling the flash memory module to use one block with an open state to store the subsequent data.

16. The memory device of claim 15, further comprising:

before writing the data into the block, resetting a variable indicating the amount of data from the host device that is written into the flash memory module; and updating the variable according to the amount of data that is written into the block; and the step of determining the amount of data from the host device written into the block comprises:

after the block is full, using the variable to determine the amount of data from the host device written into the block.

17. The memory device of claim 15, further comprising:

before writing the data into the block, resetting a variable indicating the amount of data not from the host device that is written into the flash memory module; and updating the variable according to the amount of data that is written into the block; and the step of determining the amount of data from the host device written into the block comprises:

after the block is full, determining the amount of data from the host device written into the block by subtracting the variable by the size of the block.

18. The memory device of claim 15, further comprising:

before writing the data into the block, referring to a variable to get a first value, wherein the variable is used to record a total amount of data received by the flash memory controller from the host device;

after the block is full, referring to the variable to get a second value; and the step of determining the amount of data from the host device written into the block comprises:

determining the amount of data from the host device written into the block by subtracting the first value by the second value.

19. The memory device of claim 15, further comprising:

determining a number of logical-to-physical (L2P) mapping tables that are updated during writing the data into the block, wherein each of the L2P mapping tables records a plurality of consecutive logical addresses and corresponding physical addresses in the flash memory module; and the step of determining if the sequential write operation to write the data with consecutive logical addresses into the block has been performed by the host device, according to the size of the block and the amount of data from the host device written into the block comprises:

determining if the sequential write operation to write the data with consecutive logical addresses into the block has been performed by the host device, according to the size of the block and the amount of data from the host device written into the block, and the number of L2P mapping tables that are updated during writing the data into the block.

* * * * *